United States Patent
Ayambem

(10) Patent No.: US 6,936,099 B2
(45) Date of Patent: Aug. 30, 2005

(54) LIGHTWEIGHT JOINT COMPOUND CONTAINING STABLE AIR POCKETS

(75) Inventor: Amba Ayambem, Suwanee, GA (US)

(73) Assignee: National Gypsum Properties, LLC, Charlotte, NC (US)

( * ) Notice: Subject to any disclaimer, the term of this patent is extended or adjusted under 35 U.S.C. 154(b) by 0 days.

(21) Appl. No.: 10/249,160

(22) Filed: Mar. 19, 2003

(65) Prior Publication Data

US 2004/0182287 A1 Sep. 23, 2004

(51) Int. Cl.⁷ .............................................. C04B 14/00
(52) U.S. Cl. ..................... 106/817; 106/672; 106/675; 106/677; 106/698; 106/801; 106/814; 524/426
(58) Field of Search ................................ 106/672, 675, 106/677, 698, 801, 814, 817, 795, DIG. 2; 524/426

(56) References Cited

U.S. PATENT DOCUMENTS

| | | | |
|---|---|---|---|
| 4,454,267 A | 6/1984 | Williams | 524/43 |
| 4,657,594 A | 4/1987 | Struss | 106/308 |
| 4,686,253 A | 8/1987 | Struss et al. | 524/44 |
| 5,653,797 A | 8/1997 | Patel | 106/781 |
| 6,476,099 B1 | 11/2002 | Cimaglio et al. | 523/218 |
| 6,545,066 B1 * | 4/2003 | Immordino et al. | 523/218 |
| 6,790,277 B2 * | 9/2004 | Ayambem | 106/795 |

* cited by examiner

*Primary Examiner*—J. A. Lorengo
*Assistant Examiner*—S. S. Manlove
(74) *Attorney, Agent, or Firm*—Ice Miller

(57) ABSTRACT

Low density joint compounds, and methods for their use are disclosed. Joint compounds comprising water, calcium carbonate, a foaming agent, and a rheology modification agent contain a plurality of stable air bubbles. Joint compounds can have densities of about 4 pounds per gallon to about 8 pounds per gallon. A presently prepared composition has a density of about 4.8 pounds per gallon. A presently preferred foaming agent is a polyether siloxane copolymer. A presently preferred rheology modification agent is poly(ethylene oxide). The joint compounds can comprise additional components such as perlite, mica, talc, preservatives, and latex.

30 Claims, No Drawings

US 6,936,099 B2

LIGHTWEIGHT JOINT COMPOUND CONTAINING STABLE AIR POCKETS

BACKGROUND OF INVENTION

1. Field of the Invention

The invention relates to joint compounds useful for filling and coating the joints between adjacent panels of wallboards. More specifically, it relates to reduced density joint compounds containing one or more rheology modification agents and one or more agents that produce stable air pockets.

2. Description of Related Art

Interior walls in residential and commercial properties are commonly constructed using inorganic wallboard panels or sheets such as gypsum wallboard (sometimes referred to as "wallboard" or "drywall"). Wallboards are usually prepared by enclosing a core of an aqueous slurry of gypsum and other additives between two sheets of paper. After the gypsum slurry has set and dried, the sheet is cut into standard industry sizes.

A wall is typically constructed by securing wallboards to a support structure. Screws or nails are commonly used to secure the wallboards to vertically or horizontally oriented pieces of wood. Joints are formed between adjacent wallboards. In order to conceal these joints and provide a smooth appearance to the wall, joint compounds are used to fill in the joints. Additionally, joint compounds are used to conceal the nail and screw holes formed in the wallboards, as well as any other surface indentations caused during transport or installation.

Joint compounds are commonly applied in several layers or coats. The first coat is placed into the joint using a wallboard knife, blade, or trowel. The first coat acts primarily to fill the space between adjacent wallboards. Joint tape can be embedded into the first coat of joint compound. Additional coats of joint compound can be applied to obtain a smooth finish. Each coat is allowed to dry and set prior to the application of the next coat. Failure to do so can lead to shrinkage or cracking. Sanding can be used to further smooth the surface.

Joint compounds can also be used for other purposes, such as repairing imperfections in building materials, adding textures to walls and ceilings, and so on.

Joint compounds can be supplied in the form of a dry powder, to which an amount of water is added at the work site by the applicators to give the joint compound a suitable consistency. Other joint compounds, often referred to as "ready-mix" or "ready-mixed" joint compounds, are premixed with water and other additives during manufacturing the product. These joint compounds are generally packaged and sold in a corrugated box or plastic pail in a form that is suitable for use with little or no addition of water at the job site.

Among the prior art joint compound compositions, it is generally known to use a filler (e.g., calcium carbonate, calcium sulfate hemihydrate, or calcium sulfate dihydrate), thickener, preservative, and a binder, as well as various other additives to produce a joint compound, as disclosed in U.S. Pat. No. 5,653,797 (issued Aug. 5, 1997).

Many conventional joint compounds undergo shrinkage upon drying, which makes it difficult to achieve a smooth wall surface. Shrinkage can be particularly troublesome when a second coat of compound is applied over a previous coat that is not completely dried.

Conventional joint compounds tend to be fairly dense. While this may not be troublesome to a homeowner, commercial installers typically purchase and use 4.5 gallon (17 liters) pails of joint compound. The weight of such a large volume of compound can be considerable. Various attempts have been made to prepare joint compounds having reduced densities.

U.S. Pat. No. 6,476,099 (issued Nov. 5, 2002) offered a joint compound composition comprising a filler, a binder and a hydrocarbon substituted sulfate, sulfonate, sulfuric acid or sulfonic acid. The joint compound showed reduced shrinkage and was less likely to crack than conventional joint compounds.

U.S. Pat. No. 4,686,253 (issued Aug. 11, 1987) included expanded perlite in a joint compound. The perlite was coated to render it impervious to water. A general formulation was presented having a density of 6.9 pounds per gallon (0.83 kilograms per liter).

U.S. Pat. No. 4,454,267 (issued Jun. 12, 1984) discussed including expanded perlite treated with a silicone resin in joint compounds. The density of the joint compounds were generally about 8–9 pounds per gallon (0.96–1.1 kilograms per liter), and had viscosities of about 400–470 BU (Examples 1–6). Example 7 describes a joint compound prepared at plant scale, where the compound had a density of 13.97 pounds per gallon (1.67 kilograms per liter), and a viscosity of 700 BU.

U.S. Pat. No. 4,657,594 (issued Apr. 14, 1987) proposed a joint compound containing expanded perlite which is treated with an amino-functionalized siloxane or silicone polymer together with a silicone wetting agent. The density of the joint compound was 6.9 pounds per gallon (0.83 kilograms per liter), and the viscosity was 345 BU.

Despite developments made, there still exists a need for low density joint compounds that maintain attractive workability.

SUMMARY OF INVENTION

Joint compound compositions are disclosed, comprising water, calcium carbonate, a foaming agent (such as a polyether siloxane copolymer), and a rheology modification agent (such as poly(ethylene oxide)). The compositions contain a plurality of stable air bubbles, and have lower densities than do conventional joint compounds. Densities of about 4.8 pounds per gallon (about 0.58 kilograms per liter) to about 8 pounds per gallon (about 0.96 kilograms per liter) can be achieved. Lower densities (e.g. about 4 pounds per gallon (about 0.48 kilograms per liter)) may be possible by further optimization of the compositions and their method of preparation. The joint compound compositions can further comprise additional components such as perlite, mica, talc, preservatives, and latex.

DETAILED DESCRIPTION

Efforts to develop a ready-mix joint treatment formulation that is lighter than conventional light weight formulas (i.e. having a density of less than 8.5 pounds per gallon (1 kilograms per liter)) have not been viable because the resulting formulations have been very stiff, rendering them unusable in finishing applications with either hand or tool application. The use of such formulations has been difficult in the industry, due to its differing behavior in tools and equipment. The stiffness is largely due to the use of increasing concentrations of perlite in order to reduce the density.

The instant application describes compositions that have reduced densities, yet retain attractive workability qualities.

Approaches described herein include lowering the concentrations of components having high densities, inclusion of a compound that generates stable air pockets, and inclusion of a compound which affects the composition's rheological behavior by significantly reducing its resistance to stress at stresses beyond its yield point. Addition of a compound that enhances slip and ease of spreading is also desirable.

Joint compound compositions generally can comprise water, calcium carbonate ("limestone"), a foaming agent, and a rheology modification agent. The foaming agent creates a plurality of stable air bubbles within the joint compound composition.

Unless otherwise indicated, weight percentages are indicated as weight percent relative to the weight of the total composition. For example, a composition made of 15 grams water, 20 grams calcium carbonate, and 15 grams perlite has a concentration of calcium carbonate of 40 weight percent (20 divided by 50, multiplied by 100 percent). Addition of the weight percentages of all components of a joint compound will yield 100 weight percent.

The water can generally be present at any concentration, and it is presently preferred to be present at a concentration of about 20 weight percent to about 55 weight percent. Specific examples of water concentrations include about 20 weight percent, about 25 weight percent, about 30 weight percent, about 35 weight percent, about 40 weight percent, about 45 weight percent, about 50 weight percent, about 55 weight percent, and ranges between any two of these values.

The calcium carbonate can generally be present at any concentration, and it is presently preferred to be present at a concentration of about 10 weight percent to about 50 weight percent. Specific examples of calcium carbonate concentrations include about 10 weight percent, about 15 weight percent, about 20 weight percent, about 25 weight percent, about 30 weight percent, about 35 weight percent, about 40 weight percent, about 45 weight percent, about 50 weight percent, and ranges between any two of these values.

The foaming agent can generally be any foaming agent that produces stable air bubbles in the joint compound. Examples of suitable foaming agents include polyether siloxane copolymer, Q2-5211 (Dow Corning), FF-400 (Dow Corning), SF 1288 (General Electric), and SF-1188A (General Electric).

The foaming agent can generally be present at any concentration, and it is presently preferred to be present at a concentration of about 0.01 weight percent to about 10 weight percent. Specific examples of foaming agent concentrations include about 0.01 weight percent, about 0.05 weight percent, about 0.10 weight percent, about 0.20 weight percent, about 0.30 weight percent, about 0.40 weight percent, about 0.50 weight percent, about 0.60 weight percent, about 0.70 weight percent, about 0.80 weight percent, about 0.90 weight percent, about 1 weight percent, about 2 weight percent, about 3 weight percent, about 4 weight percent, about 5 weight percent, about 6 weight percent, about 7 weight percent, about 8 weight percent, about 9 weight percent, about 10 weight percent, and ranges between any two of these values.

The rheology modification agent enhances the slip and ease of spreading the joint compound. An example of a rheology modification agent is poly(ethylene oxide) of relatively high molecular weight (e.g. at least about 200,000 grams per mole; weight average molecular weight (Mw) as determined by GPC). Poly(ethylene oxide) is commercially available as Polyox WSR N80 (Dow Chemical). The addition of a rheology modification agent to a joint compound composition rapidly decreases the stress resistance of the joint compound after the yield point has been surpassed, preventing the joint compound from being stiff and difficult to use. It also imparts exceptional slip properties on the joint compound composition, enabling it to be used in Ames tools.

The rheology modification agent can generally be present at any concentration, and it is presently preferred to be present at a concentration of about 0.01 weight percent to about 10 weight percent. Specific examples of rheology modification agent concentrations include about 0.01 weight percent, about 0.1 weight percent, about 0.5 weight percent, about 1 weight percent, about 2 weight percent, about 3 weight percent, about 4 weight percent, about 5 weight percent, about 6 weight percent, about 7 weight percent, about 8 weight percent, about 9 weight percent, about 10 weight percent, and ranges between any two of these values.

The joint compound can further comprise additional components that enhance the density, shelf stability, workability, shrink resistance, crack resistance, and other properties of the joint compound.

The joint compound can further comprise perlite. Perlite can be used to reduce the density of the joint compound. The perlite can generally be present at any concentration, and it is presently preferred to be present at a concentration of about 2 weight percent to about 40 weight percent. Specific examples of perlite concentrations include about 2 weight percent, about 5 weight percent, about 10 weight percent, about 15 weight percent, about 20 weight percent, about 25 weight percent, about 30 weight percent, about 35 weight percent, about 40 weight percent, and ranges between any two of these values.

The joint compound can further comprise mica. Mica can be added to modify the rheology of the joint compound, and it promotes crack resistance. The mica can generally be present at any concentration, and it is presently preferred to be present at a concentration of about 0.5 weight percent to about 10 weight percent. Specific examples of mica concentrations include about 0.50 weight percent, about 1 weight percent, about 2 weight percent, about 3 weight percent, about 4 weight percent, about 5 weight percent, about 6 weight percent, about 7 weight percent, about 8 weight percent, about 9 weight percent, about 10 weight percent, and ranges between any two of these values.

The joint compound can further comprise one or more preservatives. Preservatives can be used to enhance the stability and shelf life of the joint compound. The preservatives can generally be present at any concentration, and it is presently preferred to be present at a concentration of about 0.02 weight percent to about 1 weight percent. Specific examples of preservative concentrations include about 0.02 weight percent, about 0.1 weight percent, about 0.2 weight percent, about 0.3 weight percent, about 0.4 weight percent, about 0.5 weight percent, about 0.6 weight percent, about 0.7 weight percent, about 0.8 weight percent, about 0.9 weight percent, about 1 weight percent, and ranges between any two of these values.

The joint compound can further comprise talc. Talc can be added to modify the rheology of the joint compound, and it promotes crack resistance The talc can generally be present at any concentration, and it is presently preferred to be present at a concentration of about 0.5 weight percent to about 10 weight percent. Specific examples of talc concentrations include about 0.50 weight percent, about 1 weight percent, about 2 weight percent, about 3 weight percent, about 4 weight percent, about 5 weight percent, about 6 weight percent, about 7 weight percent, about 8 weight percent, about 9 weight percent, about 10 weight percent, and ranges between any two of these values.

The joint compound can further comprise latex. Latex can be added as an adhesion promoter. Latex additionally contributes to the joint compound's rheology. The latex can be added as a powder, an emulsion, or both. The latex powder used in the Examples below is Rhoximat PSB 150, a commercially available functionalized polystyrene butadiene polymer. The latex emulsion used in the Examples below is a commercially available EVA emulsion. The powder or emulsion can generally be present at any concentration, and it is presently preferred to be present at a concentration of about 0.5 weight percent to about 5 weight percent. Specific examples of latex concentrations include about 0.5 weight percent, about 1 weight percent, about 2 weight percent, about 3 weight percent, about 4 weight percent, about 5 weight percent, and ranges between any two of these values.

The joint compound can further comprise a thickener. Examples of thickeners include methylhydroxypropyl cellulose, hydroxyethyl cellulose, guar gum, and starch.

Specific exemplary compositions can contain the following ranges of components.

| Component | Range (wt %) | Example (wt %) |
|---|---|---|
| Water | 20–55% | 45.20% |
| Preservatives | 0.02–1.0% | 0.16% |
| Calcium carbonate | 10–50% | 29.0% |
| Mica | 0.5–10% | 4.52% |
| Attapulgite clay | 0.2–10% | 1.88% |
| Talc | 0.5–10% | 4.52% |
| Perlite | 2.0–40% | 9.49% |
| Poly(ethylene oxide) | 0.01–10% | 0.11% |
| Polyether siloxane copolymer | 0.01–10% | 0.06% |
| Latex emulsion | 0.5–5% | 3.01% |
| Latex powder | 0.5–5% | 1.13% |
| Cellulose ether | 0.1–8% | 0.9% |

Examples of joint compound compositions can comprise about 20 weight percent to about 55 weight percent water, about 10 weight percent to about 50 weight percent calcium carbonate, about 0.01 weight percent to about 10 weight percent foaming agent, and about 0.01 weight percent to about 10 weight percent rheology modification agent. The joint compound can comprise about 45 weight percent water, about 29 weight percent calcium carbonate, about 0.06 weight percent foaming agent, and about 0.11 weight percent rheology modification agent.

A specific example of a joint compound composition can comprise, consist essentially of, or can consist of about 45.20% water, about 0.16% preservatives, about 29.0% calcium carbonate, about 4.52% mica, about 1.88% attapulgite clay, about 4.52% talc, about 9.49% perlite, about 0.11% poly(ethylene oxide), about 0.06% polyether siloxane copolymer, about 3.01% latex emulsion, about 1.13% latex powder, and about 0.9% cellulose ether.

The density of the inventive joint compound compositions is generally about 4 pounds per gallon (about 0.48 kilograms per liter) to about 8 pounds per gallon (about 0.96 kilograms per liter). Presently prepared compositions have had densities as low as about 4.8 pounds per gallon (about 0.58 kilograms per liter), although this has not been fully optimized, and it is expected that compositions can be prepared having lower densities. Specific examples of densities include about 4 pounds per gallon (about 0.48 kilograms per liter), about 4.5 pounds per gallon (about 0.54 kilograms per liter), about 4.8 pounds per gallon (about 0.58 kilograms per liter), about 5 pounds per gallon (about 0.60 kilograms per liter), about 5.5 pounds per gallon (about 0.66 kilograms per liter), about 6 pounds per gallon (about 0.72 kilograms per liter), about 6.5 pounds per gallon (about 0.78 kilograms per liter), about 7 pounds per gallon (about 0.84 kilograms per liter), about 7.5 pounds per gallon (about 0.90 kilograms per liter), about 8 pounds per gallon (about 0.96 kilograms per liter), and ranges between any two of these values.

The inventive compositions are stable at a room temperature of 70° F. (21° C.) for an extended period of time when properly stored in a sealed container. The compositions are preferably stable for at least one week, two weeks, three weeks, one month, two months, three months, four months, five months, six months, seven months, eight months, nine months, ten months, eleven months, one year, or greater than one year.

The inventive compositions demonstrate low amounts of shrinkage when spread and dried. The shrinkage is presently preferred to be less than about 14% as measured by the NGC ring method. Presently tested compositions demonstrate shrinkage values of about 10% to about 14%, although this value has not been fully optimized, and it may be possible to obtain a lower shrinkage value from an inventive composition. Specific examples of shrinkage values include about 10%, about 11%, about 12%, about 13%, about 14%, and ranges between any two of these values.

The above described compositions can be used in all routine applications for joint compounds, including filling joints between wallboards, repairing surface defects in walls, applying textures to walls and ceilings, covering nail holes, covering screw holes, and so on.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Preparation of Three Ultra-Lite Formulations

The following formulation was prepared at a laboratory batch size using conventional mixers.

| Component | Formula 1 | Weight percent |
|---|---|---|
| Troysan 364 preservative | 0.36 g | 0.03 |
| Troysan 174 preservative | 1.75 g | 0.13 |
| Q2-5211 wetting agent | 0.75 g | 0.06 |
| PolyOx WSR N80 | 1.5 g | 0.11 |
| Latex 40716 | 40.0 g | 3.01 |
| Rhoximat PSB 150 latex powder | 15.0 g | 1.13 |
| Water | 480.0 g | 36.16 |
| Methylhydroxypropyl cellulose | 12.0 g | 0.90 |
| Attapulgite clay | 25.0 g | 1.88 |

-continued

| Component | Formula 1 | Weight percent |
|---|---|---|
| Mica | 60.0 g | 4.52 |
| Talc | 60.0 g | 4.52 |
| Calcium carbonate | 385.0 g | 29.00 |
| Perlite | 126.0 g | 9.49 |
| Additional water | 120.0 g | 9.04 |
| Gallon weight | 4.87 pounds (2.21 kg) | |

The Troysan products were obtained from Troy Corporation (Florham Park, N.J.). The Q2-5211 was obtained from Dow Corning (Midland, Mich.). The Polyox WSR N80 was obtained from Dow Chemical (Midland, Mich.). The Latex 40716 was obtained from Reichhold Chemical (Durham, N.C.). The Rhoximat PSB 150 was obtained from Rhodia Corporation (Cranbury, N.J.).

The formulation was evaluated for its weight contents, density, and viscosity. Viscosity was measured using a Braebender unit at 75 rpm. It was found to have 53.25% solids, a density of 4.87 pounds per gallon (0.58 kilograms per liter), and a viscosity of 300 BU.

Example 2

Comparison of Inventive Composition and Commercial Product

The composition described in Example 1 was produced at plant scale. The contents were scaled up, but their relative concentrations were not changed. After mixing, the composition was transferred through a series of tubes until it reached an outlet tube for packaging. Some air bubbles present within the joint compound is lost during pumping, resulting in some increase in density of the joint compound.

Samples of an inventive formulation Ultra-lite and the commercial product Plus3 (commercially available from U.S. Gypsum Company, Chicago, Ill.) were evaluated. The inventive formulation was prepared on plant scale. The commercial product is in the "lightweight" category, currently the lowest density category of commercial products. Assays were performed with all samples at a room temperature of 70° F. (21° C.). Percent shrinkage was performed in duplicate and averaged. Viscosity was measured using a Braebender unit at 75 rpm. Crack resistance was performed at 70° F. (21° C.) and 40% relative humidity. The crack resistance and working/application values were determined by skilled applicators using a scale of 1 to 10, with 10 being most favorable.

Shrinkage was determined using the NGC ring method. The method involves the use of an analytical balance accurate to 0.01 grams, a shrinkage ring, a small cup, a spatula, a mud knife, and joint compound. The ring is placed on a piece of wallboard. The cup, joint compound, spatula, and knife are tared on the balance. The spatula is used to fill the space in the shrinkage ring with joint compound. The knife is used to create a level surface over the ring. The knife, spatula, and excess compound is returned to the cup. The negative weight displayed on the balance is equal to the weight of the joint compound in the ring (value "x"). The joint compound in the ring is allowed to dry for about 24 hours at 70° F. (21° C.) and 40% relative humidity. The steps of adding joint compound and leveling is repeated. The weight of joint compound used in the second round is value "y". The percent shrinkage is calculated equal to 100 times y divided by the sum of x and y; % shrinkage=100 times y/(x+y).

| Formula category | Ultra-lite (NGC) Inventive | Plus3 (USG) Conventional lightweight |
|---|---|---|
| 4.5 gallon (17 liter) Pail weight | 36.0 pounds (16 kilograms) | 45.0 pounds (20 kilograms) |
| Water separation | None | None |
| Gallon weight | | |
| As-opened | 8.00 pounds (3.63 kilograms) | 9.95 pounds (4.51 kilograms) |
| Mixed | 7.97 pounds (3.62 kilograms) | 10.02 pounds (4.54 kilograms) |
| Viscosity (mixed) | 430 BU | 510 BU |
| % Shrinkage | 10.45 and 9.37 | 14.04 and 15.25 |
| Average | 9.91 | 14.65 |
| Ring cracks | None | None |
| % Solids | 52.82 | 53.98 |
| Crack resistance | 10 | 10 |
| Working/Application | 9+ | 9 |
| Ease | 9+ | 9 |
| Cratering | 9+ | 9 |
| Wet edge | 8+ | 8+ |
| Open time | 8+ | 8+ |

The Ultra-lite used in the above assay was prepared in a batch process at a plant trial. When prepared in a laboratory batch setting (such as in Example 1), the Ultra-lite composition recorded densities of about 4.87 pounds per gallon (0.58 kilograms per liter). It is expected that continuous production of this formula on a plant scale would clean out the production system and progressively bring the product's density within range of the densities observed in laboratory batches. The density of the plant-scale product is expected to settle around 7.00 pounds per gallon (0.84 kilograms per liter), which means that a 4.5-gallon quantity (the amount that typically in a commercial pail) would weigh of around 32 pounds.

Example 3

Comparison of Inventive and Traditional Ready-Mix Formulations

The following table summarizes the weights and shrinkage properties of the inventive Ultra-lite and traditional ready-mix formulas, all prepared at plant scale.

| Formula | Pail weights | Density | Percent shrinkage |
|---|---|---|---|
| All Purpose | 64–67 pounds (29.0–30.4 kg) | 14.2–14.9 lb/gal (1.7–1.8 kg/l) | 20–23 |
| Multi-Use/Midweight | 53–55 pounds (24.0–24.9 kg) | 11.8–12.2 lb/gal (1.4–1.5 kg/l) | 18–20 |
| Liteweight | 43–48 pounds (19.5–21.8 kg) | 9.6–10.7 lb/gal (1.2–1.3 kg/l) | 15–18 |
| Ultra Liteweight | 32–36 pounds (14.5–16.3 kg) | 7.1–8.0 lb/gal (0.85–0.96 kg/l) | 10–14 |

The inventive compositions display significant reductions in pail weights due to their lower density. A pail of the inventive compositions are about 50% lighter than a pail of All Purpose joint compound, about 35% lighter than a pail of Multi-Use/Midweight joint compound, and about 30% lighter than a pail of Liteweight joint compound. The inventive compositions display significantly reduced shrinkage upon drying. This results in fewer coatings of joint compound during wallboard insulation, which translates into savings of time, labor, and materials.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

What is claimed is:

1. A joint compound composition comprising water, calcium carbonate, a foaming agent, and a rheology modification agent, wherein:
   the composition comprises a plurality of stable air bubbles;
   the concentration of foaming agent in the composition is about 0.01 weight percent to about 10 weight percent; and
   the composition has a density of about 4 pounds per gallon to about 8 pounds per gallon.

2. The composition of claim 1, wherein the foaming agent is a polyether siloxane copolymer.

3. The composition of claim 1, wherein the rheology modification agent is poly(ethylene oxide).

4. The composition of claim 1, wherein the concentration of water in the composition is about 20 weight percent to about 55 weight percent.

5. The composition of claim 1, wherein the concentration of calcium carbonate in the composition is about 10 weight percent to about 50 weight percent.

6. The composition of claim 1, wherein the concentration of rheology modification agent in the composition is about 0.01 weight percent to about 10 weight percent.

7. The composition of claim 1, further comprising perlite.

8. The composition of claim 7, wherein the concentration of perlite in the composition is about 2 weight percent to about 40 weight percent.

9. The composition of claim 1, further comprising mica.

10. The composition of claim 9, wherein the concentration of mica in the composition is about 0.5 weight percent to about 10 weight percent.

11. The composition of claim 1, further comprising talc.

12. The composition of claim 11, wherein the concentration of talc in the composition is about 0.5 weight percent to about 10 weight percent.

13. The composition of claim 1, further comprising a preservative.

14. The composition of claim 13, wherein the concentration of preservative in the composition is about 0.02 weight percent to about 1 weight percent.

15. The composition of claim 1, further comprising latex emulsion.

16. The composition of claim 15, wherein the concentration of latex emulsion in the composition is about 0.5 weight percent to about 5 weight percent.

17. The composition of claim 1, further comprising a latex powder.

18. The composition of claim 17, wherein the concentration of latex powder in the composition is about 0.5 weight percent to about 5 weight percent.

19. A joint compound comprising
   water, calcium carbonate, a foaming agent, and a rheology modification agent, wherein:
   the composition comprises a plurality of stable air bubbles;
   the composition has a density of about 4 pounds per gallon to about 8 pounds per gallon; and
   the composition is stable at 70° F. for at least about six months.

20. The composition of claim 1, wherein the composition has a density of about 4.8 pounds per gallon.

21. A joint compound composition comprising:
   about 20 weight percent to about 55 weight percent water;
   about 10 weight percent to about 50 weight percent calcium carbonate;
   about 0.01 weight percent to about 10 weight percent foaming agent; and
   about 0.01 weight percent to about 10 weight percent rheology modification agent;
   wherein the composition has a density of about 4 pounds per gallon to about 8 pounds per gallon.

22. The composition of claim 21, wherein the foaming agent is a polyether siloxane copolymer.

23. The composition of claim 21, wherein the rheology modification agent is poly(ethylene oxide).

24. A joint compound composition comprising:
   about 45 weight percent water;
   about 29 weight percent calcium carbonate;
   about 0.06 weight percent polyether siloxane copolymer; and
   about 0.11 weight percent poly(ethylene oxide).

25. A joint compound composition comprising:
   about 20 weight percent to about 55 weight percent water;
   about 10 weight percent to about 50 weight percent calcium carbonate;
   about 0.01 weight percent to about 10 weight percent polyether siloxane copolymer;
   about 0.5 weight percent to about 10 weight percent mica;
   about 0.5 weight percent to about 10 weight percent talc;
   about 2.0 weight percent to about 40 weight percent perlite;
   about 0.01 weight percent to about 10 weight percent poly(ethylene oxide);
   about 0.5 weight percent to about 5 weight percent latex emulsion;
   about 0.5 weight percent to about 5 weight percent latex powder; and
   about 0.1 weight percent to about 8 weight percent cellulose ether.

26. The composition of claim 25, having a density of about 4 pounds per gallon to about 8 pounds per gallon.

27. The composition of claim 25, having a density of about 4.8 pounds per gallon.

28. A joint compound consisting essentially of:
   about 45.2 weight percent water;
   about 0.16 weight percent preservatives;
   about 29.0 weight percent calcium carbonate;
   about 4.52 weight percent mica;
   about 4.52 weight percent talc;
   about 9.49 weight percent perlite;
   about 0.11 weight percent poly(ethylene oxide);
   about 0.06 weight percent polyether siloxane copolymer;
   about 3.01 weight percent latex emulsion;
   about 1.13 weight percent latex powder; and
   about 0.9 weight percent cellulose ether.

29. The composition of claim 28, having a density of about 4 pounds per gallon to about 8 pounds per gallon.

30. The composition of claim 28, having a density of about 4.8 pounds per gallon.

* * * * *